United States Patent [19]

Grannen

[11] 3,839,222
[45] Oct. 1, 1974

[54] EXTRACTION OF BORON FROM AQUEOUS SOLUTIONS WITH SALICYLIC ACID DERIVATIVES AND ISOAMYL ALCOHOL

[76] Inventor: Edward A. Grannen, 1431 Isabelita Ct., Upland, Calif. 91786

[22] Filed: Mar. 16, 1973

[21] Appl. No.: 342,076

Related U.S. Application Data

[62] Division of Ser. No. 175,007, Aug. 25, 1971.

[52] U.S. Cl. ............... 252/364, 23/312 R, 252/182, 423/112
[51] Int. Cl. ............................ B01j 9/22, B01f 3/08
[58] Field of Search ............ 252/364, 182; 423/112; 23/312 R; 260/520, 521 R, 521 A

[56] References Cited
UNITED STATES PATENTS 3,111,383  11/1963  Garrett et al. ................... 23/312 R
3,741,731  6/1973  Peterson ........................... 423/112

OTHER PUBLICATIONS

Chemical Abstracts, American Chemical Soc., Vol. 67, (1967), 94,462K and 111,844f.

*Primary Examiner*—Leland A. Sebastian
*Assistant Examiner*—Irwin Gluck
*Attorney, Agent, or Firm*—Christie, Parker & Hale

[57] ABSTRACT

A process for extracting boron from aqueous boron containing solutions by contacting the aqueous solution with a substantially water immiscible salicylic acid derivative or a salt thereof, nuclear substituted with an alkyl, aryl, alkaryl, or cycloakyl radical wherein the derivative has at least 11 carbon atoms in a water immiscible solvent comprising isoamyl alcohol in the range of from 10 to 100 percent by volume. Preferably, the balance of the solvent is an inexpensive water immiscible petroleum cut. Boron is sequestered by the salicylic acid derivative and the isoamyl alcohol has a synergistic effect in enhancing the proportion of boron extracted.

10 Claims, No Drawings

EXTRACTION OF BORON FROM AQUEOUS SOLUTIONS WITH SALICYLIC ACID DERIVATIVES AND ISOAMYL ALCOHOL

CROSS REFERENCE TO RELATED APPLICATIONS

This is a division, of U.S. Pat. application Ser. No. 175,007, filed Aug. 25, 1971, now U.S. Pat. No. 3,812,238.

BACKGROUND

This application comprises an improvement on co-pending U.S. Pat. application Ser. No. 172,904 now U.S. Pat. No. 3,741,731 entitled "Extraction of Boron From Aqueous Solutions with Salicylic Acid Derivatives," by Willard D. Peterson and assigned to Occidental Petroleum Corporation, assignee of this application. A number of suitable salicylic acid derivatives are set forth specifically therein along with details of processes for synthesizing and using such derivatives. The teachings of this copending application are hereby incorporated by reference for full force and effect as if set forth in full herein.

It is often desirable to remove boron from natural or artificial waters and brines both for purification purposes and for recovery of the valuable boron. Thus, for example, in some areas large amounts of water are not suitable for irrigation because the boron content exceeds two or three parts per million, which is the tolerable limit for citrus and some other agricultural crops. Large scale economical removal of boron from such dilute solutions is desirable. Similarly, boron contamination is commonly present in magnesium chloride brines, and it interferes with subsequent production of magnesium metal by way of electrowinning operations. Many brines contain a sufficient boron concentration that boric acid can economically be recovered therefrom.

A variety of ion exchange systems have been employed for extracting boron values from aqueous solutions. Solid ion exchange resins have certain technical difficulties in handling large volumes of solutions because of the relatively low sequestering rates that may be present and, further, there are problems of contamination of ion exchange resins by particulate matter and the like.

Another technique for removing boron values from dilute aqueous solutions and brines is by liquid-liquid extraction wherein the aqueous phase is contacted by a water immiscible organic phase containing a material with which the boron is complexed so as to partition principally to the organic phase instead of the aqueous phase. The boron depleted aqueous phase and boron containing organic phase are separated so that the boron can be extracted therefrom by contacting the organic phase with a strong acid or strong base as may be desired. A number of organic extracting agents have been employed for extracting boron values from aqueous solutions, including aliphatic diols or other diols, catechols, and certain aliphatic alcohols. The use of isoamyl alcohol to extract boron from aqueous solution is mentioned in Chemical Abstracts 67 94462, referencing Zh. Neorg. Khim 12, 1624 (1967), and in Chemical Abstracts 67 111844, referencing Zh. Neorg. Khim 12, 1930 (1967). In the aforementioned copending patent application a number of nuclear substituted salicylic acid derivatives for extraction of boron from dilute aqueous solutions are described in detail. In this process as well as other extraction processes, it is important for economic reasons to extract as much boron as possible into the water immiscible organic phase so that the number of sequential contacts between the organic phase and the aqueous phase can be reduced. The quantity of boron that is removed can be increased by increasing the total volume of organic phase with consequent cost increases; however, it is preferable to enhance the distribution coefficient between the organic and aqueous phases so that a larger quantity of boron is contained in a smaller volume of organic phase. This not only reduces the number of sequential contactings for complete extraction, but also decreases the capital cost required for an economical boron extraction plant.

BRIEF SUMMARY OF THE INVENTION

Therefore, in practice of this invention according to a presently preferred embodiment there is provided a composition comprising a substantially water immiscible nuclear substituted salicylic acid derivative having the formula

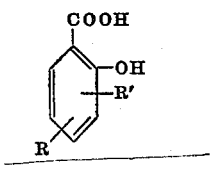

wherein R and R' are radicals selected from the group consisting of hydrogen, halogen, alkyl, aryl, alkaryl, and cycloalkyl radicals having sufficient carbon atoms that the substituted salicylic acid derivative has at least 11 carbon atoms in the molecule in a proportion of from about 0.05 molar to the solubility limit in a water immiscible solvent including isoamyl alcohol in the range of from about 10 to 100 percent by volume of the solvent. The salicylic acid derivative has one radical selected from the group consisting of alkyl, aryl, alkaryl and cycloalkyl groups having at least three carbon atoms and the other radical is selected from the group consisting of hydrogen, halogen and alkyl groups; and encompasses alkali, alkaline earth, ammonium or organic ammonium salts thereof. A process for extracting boron from aqueous solution by contacting the aqueous solution with the above composition is provided.

DESCRIPTION

Boron can be extracted from aqueous solutions thereof by contacting the solution with a substantially water immiscible salicylic acid derivative carried in a water immiscible organic solvent. It is found in practice of this invention that the partition coefficient and proportion of boron extracted from an aqueous solution is enhanced by employing a water immiscible solvent comprising isoamyl alcohol in the proportion of from about 10 to 100% by volume as a solvent for the salicylic acid derivative.

The preferred extraction agent employed in practice of this invention is a substantially water immiscible nuclear substituted salicylic acid derivative having the formula

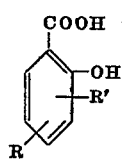

where R and R' represent radicals selected from the class consisting of hydrogen, halogen, alkyl radicals, aryl radicals, alkaryl radicals, cycloalkyl radicals and mixtures thereof; and also alkali, alkaline earth, ammonium and organic ammonium salts thereof. For best results, the derivative of salicylic acid has a total of at least 11 carbon atoms in the molecule, and preferably less than about 40 carbon atoms. Preferably R' and R are substituted in the 3- and 5- positions respectively. Preferably R is selected from the group consisting of alkyl, aryl, alkaryl, and cycloalkyl radicals having at least 3 carbon atoms and R' is selected from the group consisting of hydrogen, halogen, and alkyl groups. The salicylic acid derivatives containing a 5- tertiary alkyl group from 8 to 12 carbon atoms are particularly preferred.

A few examples of suitable salicylic acid derivatives include 5-tertiary butyl salicylic acid, 5-tertiary octyl salicylic acid, 5-isooctyl salicylic acid, 5-tertiary amyl salicylic acid, 5- tertiary nonyl salicylic acid, 5-benzyl salicylic acid, 5-cyclohexyl salicylic acid, 3,5-di-isopropyl salicylic acid, 3,5-di-tertiary butyl salicylic acid, 3-isobutyl, 5-ethyl salicylic acid, 3-isopropyl-6-methyl salicylic acid, 3-methyl-6-isopropyl salicylic acid, and 3,5-di-tertiary dodecyl salicylic acid. A particularly preferred salicylic acid derivative is 5-tertiary octyl salicylic acid which is more specifically 5-(1,1,3,3-tetramethyl butyl) salicylic acid.

The salicylic acid derivative contains at least 11 carbon atoms in order to have sufficient water immiscibility that only a very small quantity of the extraction agent is carried away in the boron depleted water or in the strong acid or base used for stripping the boron from the organic phase. When the salicylic acid derivative has less than 11 carbon atoms it may be sufficiently soluble in water to be uneconomical for very large-scale operation. Preferably, the salicylic acid derivative has less than about 40 carbon atoms in the molecule, since such derivatives can be made from commercially available raw materials without excessive cost.

It is particularly preferred that the salicylic acid derivatives contain a tertiary alkyl group having from 8 to 12 carbon atoms substituted in the 5-position, that is, as radical R in the above formula. Such salicylic acid derivatives are found to have excellent stability in the organic carrier solvent as well as excellent water immiscibility so as to remain in the organic phase during the extraction step with a boron containing brine, and during the stripping step when in contact with a strong acid or base. These materials are stable so that they do not decompose readily and can be recycled many times. If the derivative has a radical having less than eight carbon atoms, it may have excessive water solubility for use in large-scale boron extraction operations. If the salicylic acid derivative has a tertiary alkyl group having more than about 12 carbon atoms, the expense of the raw materials for making the derivative is sufficiently high that the product is not suitable for large-scale operations. The alkali, alkaline earth, ammonium and organic ammonium salts of the nuclear substituted salicylic acid are also suitable for practice of this invention, particularly when minimum change in pH is desired.

The boron extractive agent is carried in an inert water immiscible carrier solvent that provides a separate phase that can be intimately contacted with the aqueous phase without forming strong emulsions so that it separates relatively rapidly.

A variety of water immiscible organic carrier solvents may be employed for the salicylic acid derivative; however, it has been discovered that when the salicylic acid derivative is carried in an organic solvent comprising isoamyl alcohol in the range of from about 10 to 100 percent of the organic solvent there is a synergistic effect wherein the amount of boron extracted from the solution and the partition coefficient are increased significantly above the values obtained for isoamyl alcohol alone or in combination with other organic solvents, and also as compared with extraction by salicylic acid derivatives in organic solvents in the absence of isoamyl alcohol.

The water immiscible phase preferably contains other water immiscible organic solvents in addition to the isoamyl alcohol and may include aliphatic hydrocarbons, aromatic hydrocarbons, other aliphatic or aromatic alcohols, phenolics, ethers, chlorocarbons and the like, either alone or in the form of mixtures. Adjuncts in the organic phase may include water immiscible primary, secondary, and tertiary alkyl amines, which contain at least 12 carbon atoms and ammonium salts of such amines.

A particularly suitable ingredient in the water immiscible organic phase comprises distillation cuts or fractions from petroleum refining, which typically are mixtures of organic compounds and form inexpensive and suitable organic carriers. Suitable materials include ordinary kerosene, odorless kerosene, Amsco Solvent-G, and the like. Amsco Solvent-G is an aromatic hydrocarbon having an initial boiling point of 363° F, a 50 percent boiling point of 381° F, and a dry end point of 408° F. Amsco Solvent-G has in excess of 98 percent compounds having eight or more carbon atoms.

It is preferred that the proportion of isoamyl alcohol in the solvent be in the range of from about 10 to 100 percent by volume. If the proportion of isoamyl alcohol is less than about 10 percent, difficulty may be encountered in dissolving a sufficient quantity of nuclear substituted salicylic acid derivative for efficient boron extraction.

It is particularly preferred that the isoamyl alcohol be present in the range of from about 25 to 50 percent by volume with the balance being made up of other substantially water immiscible hydrocarbons. It is particularly preferred that the other hydrocarbon be an inexpensive aromatic petroleum cut or the like. It is particularly preferred that the isoamyl alcohol in the solvent be at least about 25 percent by volume since a sufficient quantity of boron may be removed thereby, that the total volume of organic phase is not excessive and capital costs are thereby reduced. No substantial benefit is obtained by increasing the proportion of isoamyl alcohol above about 50 percent by volume of the solvent since there is little improvement in the proportion of boron extracted and the isoamyl alcohol is typically more expensive than the preferred petroleum cuts or the like making up the balance of the solvent.

The nuclear substituted salicylic acid derivative is preferably present in the above described organic solvent, including isoamyl alcohol, in a proportion in the range of from about 0.05 molar up to the solubility limit of the derivative in the organic solvent. When the quantity of salicylic acid derivative is reduced below about 0.05 molar, the total quantity of the derivative may be near the total amount of boron in the water phase, and the extraction efficiency drops off. Typically, the maximum solubility of the preferred salicylic acid derivatives is 0.4 molar in the aforementioned solvents.

It is particularly preferred that the salicylic acid derivative be present in the range of from about 0.05 to 0.1 molar. Excellent results are obtained with salicylic acid derivatives employed at about 0.1 molar and no significant increase in extraction efficiency is obtained by further increasing the salicylic acid derivative concentration. Further, there is a slight tendency towards forming emulsions of the two phases when the salicylic acid derivative content is higher than about 0.1 molar, and the expense of the derivative goes up without concomitant increased performance. In the preferred range, the concentration of the derivative is easily controlled and good phase separation is obtained under substantially all operating conditions.

The organic phase comprising the salicylic acid derivative in the above described water immiscible carrier is intimately contacted with the boron containing aqueous solution in any suitable conventional manner, such as, for example, by countercurrent flow, stirring, shaking, and the like.

The volume ratio of organic phase to aqueous phase is preferably in the range of from about 1:50 to 10:1, or even higher. Phase ratios ranging from about 1:10 to 10:1 are generally preferred for most economical extraction with the least number of extraction steps for complete extraction without significant loss of extraction agent. A relatively high volume ratio of organic phase to aqueous phase is preferably employed when the boron concentration in the aqueous solution is relatively low, or where the highest possible extraction efficiency is desired.

As is well known, extraction efficiency is enhanced by serially performing the extraction step with organic phase having successively lower boron concentrations, i.e., by a countercurrent multiple extraction process. The number of repetitions of the process will vary depending on the desired degree of extraction and the original boron concentration. Contact times between the organic and aqueous phase in excess of about 1 minute may be required for adequate extraction, and a contact time in the range of from 1 to 5 minutes is preferred.

The extraction is preferably conducted so that the final pH of the boron deficient aqueous solution is between about 0.5 and 9.0. The final pH depends in large part on the nature and concentration of materials other than boron in the aqueous solution. It is particularly preferred that the extraction be conducted to yield a final pH in the boron deficient solution in the range of from about 1 to 6 in order to obtain highest efficiency of boron extraction for most aqueous solutions. Temperature of the liquids during the extraction step is not critical and is typically in the range of from about 10° to 80° C. It is most convenient to perform the process at or near room temperature or the ambient temperature of the aqueous solution source.

After the organic phase and the aqueous phase have been maintained in intimate contact for a sufficient period for the boron to be sequestered and to partition principally in the organic phase, these phases are permitted to separate by allowing layers to form and decanting one or both of such layers. The aqueous layer, now substantially depleted in boron, may be subjected to an additional similar extraction step for further depleting the boron or may be otherwise used in commerce in a conventional manner.

The organic phase, which is rich in boron sequestered by the salicylic acid, is then stripped of such boron values by intimately contacting the organic phase with an aqueous solution of a mineral acid such as hydrochloric, sulfuric, sulfurous, phosphoric, or the like. Distilled water will also strip boron from the organic phase. The boron values partition to the aqueous phase and may be separated therefrom by conventional techniques. Thus, for example, when sulfuric acid is employed, the stripping aqueous phase may include magnesium sulfate and boric acid in the sulfuric acid solution, and the boric acid may be precipitated in relatively high purity form. Similarly, if desired, the organic phase can be stripped of boron values by contacting with an alkaline solution, such as, for example, sodium carbonate in order to recover boron in the form of borax; however, this has lower economic value in most cases and stripping with mineral acid is preferred. Stripping with alkaline solution results in a salt of the substituted salicylic acid derivative, a portion of which may be in the aqueous phase and which could be recovered by neutralization. When the salt is used for extraction, there is less pH change in the boron depleted aqueous phase than when the corresponding acid is present.

The organic phase is substantially free of boron after stripping and is preferably recycled and reused for additional boron extraction.

The process of extracting boron with the above described salicylic acid derivatives is particulary advantageous in natural brines containing iodine. Catechols and other boron sequestering agents often react with iodine and both the catechol and iodine may be lost. Some natural brines contain as high as 2 grams per liter of iodine or iodide ion. Processes for extracting boron from iodine containing brines are satisfactory since the iodine does not seem to attack the salicylic acid derivatives hereinabove described.

EXAMPLES

Boron has been extracted successfully from a mildly acid, iodine-containing, Chilean brine. A typical analysis of this Chilean brine, which varies somewhat from day to day, because of changes in source is 350 grams per liter of sodium nitrate, 172 grams per liter of sodium chloride, 58 grams per liter of sodium sulfate, 5.2 grams per liter potassium perchlorate, 30 grams per liter magnesium, 17.9 grams potassium, and 1.14 grams per liter of iodine. In addition, the concentration of boric acid is typically in the range of from about 15 to 18 grams per liter. The alkalinity of this brine as a sodium carbonate equivalent is 2.86, and the pH is typically about 5.0. The total salt concentration of the brine, determined by evaporation at 110° C, is typically about 607 grams per liter.

In a process for extracting boron from this brine, a water immiscible solvent comprising 50 percent by volume of Amsco Solvent-G and 50 percent by volume of isoamyl alcohol is employed. Dissolved in this solvent is a sufficient quantity of 5-tertiary octyl salicylic acid to give a 0.1 molar solution. (This compound is more explicitly 5-(1,1,3,3,-tetramethyl butyl)-salicylic acid.)

Approximately three volumes of the above described organic phase are mixed with one volume of brine in a vessel equipped for strenuous mechanical agitation so that the two phases are brought into sufficiently intimate contact for sequestering of boron from the aqueous phase to the organic phase to occur. Average residence time of the organic phase and the brine in the extraction vessel is about five minutes; however, this may vary depending on the efficiency of agitation actually achieved.

The mixed aqueous and organic phases are permitted to separate and the two phases are separately removed. This extraction process is repeated four to six times in a countercurrent manner wherein fresh brine and fresh extractant flow in opposite directions. In this way the fresh brine having the highest boron concentration is contacted with the most loaded extractant and the freshest extractant having the greatest sequestering power contacts the most depleted brine. A distribution coefficient of between 0.7 and 0.8 is typically observed. At each successive pass in the countercurrent process 65 to 85 percent of the boron values are present in the organic phase. In this way, with from four to six successive contactings, substantially all boron values are removed from the depleted brine.

The organic phase is then passed in countercurrent flow with mechanical agitation with an aqueous solution having at least 10 percent sulfuric acid concentration. This stripping solution removes boron sequestered with the salicylic acid derivative to form a boric acid solution in the aqueous stripping phase. The boron values are precipitated from the stripping solution in a conventional manner. Typically the stripping solution also includes sodium, potassium, and magnesium ions extracted with the boron from the brine. Typically the amount of such additional ions carried over is less than about 70 percent higher than the quantity of boron carried over, so that a high degree of concentration of the boron values as compared with the original brine is obtained.

Similar results are obtained with water immiscible organic extractant phases including from about 10 to 50 percent or more of isoamyl alcohol and other water immiscible nuclear substituted salicylic acid derivatives with a total of at least 11 carbon atoms in the derivative molecule. Thus, for example, good boron extractions are obtained using procedures and parameters as set forth in the above example when the following salicylic acid derivatives are employed in the organic extractant phase: 5-tertiary butyl salicylic acid; 5-tertiary amyl salicylic acid; 5-tertiary nonyl salicylic acid; 3,5-di-tertiary butyl salicylic acid; 5-benzyl salicylic acid; 5-cyclohexyl salicylic acid; 3-isobutyl 5-ethyl salicylic acid; 3,5-di-tertiary dodecyl salicylic acid; 5-isooctyl salicylic acid; 3-ethyl 5-cyclohexyl salicylic acid, and the like.

The series of laboratory screening tests set forth in the following table demonstrate the synergistic effect of isoamyl alcohol in combination with a nuclear substituted salicylic acid derivative as compared with either the isoamyl alcohol alone, or the derivative along or in combination with other organic materials. These data were obtained with a brine substantially the same as that set forth above except for those tests preceded by a double asterisk which employed a boric acid solution having 10.67 g/l boric acid in water or dilute brine. In all of these screening tests Amsco Solvent-G was employed, which comprises an aromatic hydrocarbon petroleum cut in which the salicylic acid derivative has insufficient solubility for use of the solvent as the sole organic carrier in the organic phase. Additional organic materials that enhance the solubility of the salicylic acid derivative are therefore combined with the aromatic solvent. In the following table it will be understood that Amsco Solvent-G forms the balance of the solvent portion of the extractant phase in each instance, and is therefore not specifically stated. In the column headed "Extractant" the designation "OSA" is employed as an abbreviation for 5-tertiary octyl salicylic acid. The designation "isoamyl" is employed to indicate isoamyl alcohol. The designation "Aliq. 336" designates methyl trioctyl ammonium chloride which was obtained under the trademark "Aliquat 336." The column "O/A ratio" designates the volume ratio of the organic phase to the aqueous phase in the extraction. The column labeled "pH" represents the pH of the depleted aqueous brine after extraction of the boron values by the organic extractant phase. In each case the pH of the brine before extraction was 5.0, with the exception of those data wherein the pH value is marked with an asterisk, in which cases the pH was adjusted to 7.0 by addition of sodium hydroxide before the extraction tests were made.

In all of these tests, the extractant phase was mechanically agitated with the boron containing brine for 30 minutes at ambient temperature. The aqueous and organic phases separated into layers after agitation, and the removed aqueous layer was filtered and analyzed for remaining boron. The data obtained are set forth in the table in the column headed "percent B Extracted." The final column in the table headed "Dist. Coef." gives the distribution or partition coefficient determined by the weight ratio of boron in the organic phase to the boron in the aqueous phase with the data normalized to account for the different volumes of liquids employed in the various tests.

| Extractant | O/A Ratio | pH | % B Extracted | Dist. Coef. |
| --- | --- | --- | --- | --- |
| 50% n-butanol | 2.5 | 5.6 | 25 | 0.133 |
| 25% n-butanol | 5 | 5.7 | 31 | 0.090 |
| 50% 2-octanol | 2.5 | 5.5 | 26 | 0.141 |
| 25% 2-octanol | 5 | 5.6 | 32 | 0.094 |
| 50% isodecanol | 5 | *7.3 | 33 | 0.099 |
| 25% isodecanol | 5 | *7.3 | 26 | 0.070 |
| 50% isodecanol | 2.5 | 6.2 | 48 | 0.369 |
| 50% isodecanol | 5 | 6.3 | 63 | 0.341 |
| 25% isodecanol | 5 | 6.0 | 51 | 0.208 |
| ** 50% isoamyl | 5 | 5.4 | 25.2 | 0.068 |
| 50% isoamyl | 2 | 5.7 | 28.8 | 0.202 |
| 50% isoamyl | 5 | 6.5 | 60.1 | 0.307 |
| 25% isoamyl | 2 | 5.9 | 38.0 | 0.306 |

—Continued

| Extractant | O/A Ratio | pH | % B Extracted | Dist. Coef. |
|---|---|---|---|---|
| 25% isoamyl | 5 | 6.3 | 57.2 | 0.266 |
| 0.4M OSA+50% isodecanol | 2.5 | 3.0 | 55 | 0.489 |
| 0.1M OSA+50% isodecanol | 2.5 | 4.3 | 56 | 0.509 |
| 0.1M OSA+50% isodecanol | 5 | 4.2 | 71 | 0.489 |
| 0.1M OSA+50% isodecanol | 1.5 | 4.6 | 43 | 0.503 |
| 0.2M OSA+25% isodecanol | 5 | 3.7 | 62 | 0.326 |
| 0.05M OSA+25% isodecanol | 5 | 4.6 | 63 | 0.341 |
| 0.1M OSA+25% isoamyl | 2 | 4.3 | 48.0 | 0.461 |
| 0.1M OSA+25% isoamyl | 3 | 4.3 | 59.3 | 0.474 |
| 0.1M OSA+25% isoamyl | 4 | 4.1 | 65.6 | 0.477 |
| 0.1M OSA+25% isoamyl | 5 | 4.1 | 71.0 | 0.490 |
| 0.1M OSA+50% isoamyl | 2 | 4.5 | 58.3 | 0.699 |
| 0.1M OSA+50% isoamyl | 3 | 4.2 | 68.7 | 0.732 |
| 0.1M OSA+50% isoamyl | 4 | 4.2 | 74.0 | 0.712 |
| 0.1M OSA+50% isoamyl | 5 | 4.1 | 79.1 | 0.757 |
| 0.1M OSA+50% isoamyl | 5 | 2.8 | 77.5 | 0.688 |
| ** 0.1M OSA+25% isoamyl | 2 | 4.9 | 17.5 | 0.106 |
| ** 0.1M OSA+25% isoamyl | 5 | 5.0 | 32.5 | 0.096 |
| ** 0.1M OSA+50% isoamyl | 2 | 5.3 | 24.7 | 0.164 |
| ** 0.1M OSA+50% isoamyl | 5 | 5.3 | 44.1 | 0.158 |
| ** 0.1M OSA+50% isoamyl | 5 | 5.1 | 43.6 | 0.155 |
| 0.1M OSA+.1M Aliq.+50% isoamyl | 5 | 2.7 | 75.0 | 0.600 |
| ** 0.1M OSA+.1M Aliq.+50% isoamyl | 5 | 1.4 | 48.9 | 0.191 |
| 0.1M OSA+0.1M Aliq.+50% isodecanol | 2.5 | 3.8 | 56 | 0.509 |
| 0.2M OSA+6% 2-octanol | 5 | *4.1 | 53 | 0.226 |

The data set forth in the above table show that isodecanol and isoamyl alcohol are approximately comparable in the ability to extract boron from brine. n-butanol and 2-octanol are inferior to either isodecanol or isoamyl alcohol. Surprisingly, however, when the salicylic acid derivative is combined with a solvent including isoamyl alcohol, a much higher boron extraction is obtained than when the salicylic acid derivative is added to a solvent including isodecanol. The reason for the synergistic effect of isoamyl alcohol and the salicylic acid derivative is not known.

Similar good results are obtained with other nuclear substituted salicylic acid derivatives in combination with isoamyl alcohol in organic phases as set forth in the following table.

| Salicylic Acid (SA) Derivative | Concentration | Organic Solvent |
|---|---|---|
| 3,5-di-tertiary butyl SA | 0.2M | 50% Amsco G, 50% isoamyl alcohol |
| 5-tertiary amyl SA | 0.1M | do. |
| 5-tertiary nonyl SA | 0.1M | do. |
| 3-ethyl-5 cyclohexyl SA | 0.15M | do. |
| 3-amyl-5 tertiary octyl SA | 0.1M | do. |
| 3-isobutyl-5 ethyl SA | 0.1M | do. |
| 3,5-di-tertiary nonyl SA | 0.1 | do. |
| 5-benzyl SA | 0.1 | do. |
| 3,5-di-tertiary decyl SA | 0.1 | do. |
| 3-isopropyl-6 methyl SA | 0.1 | do. |
| 3-chloro-5 tertiary octyl SA | 0.1 | do. |

Although limited examples of extractions embodying principles of this invention have been set forth in detail herein, it will be understood that many modifications and variations can be made by one skilled in the art. It is, therefore, to be understood that within the scope of the appended claims the invention may be practiced otherwise than as specifically described.

What is claimed is:

1. A composition comprising:
   a substantially water immiscible organic solvent comprising from 10 to 100 percent by volume of isoamyl alcohol; and
   at least 0.05 molar concentration of substantially water immiscible, nuclear substituted salicylic acid or alkali, alkaline earth, ammonium or organic ammonium salt thereof, in the solvent, said nuclear substituted salicylic acid having the formula

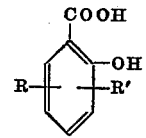

wherein R is selected from the group consisting of alkyl, aryl, alkaryl and cycloalkyl groups having at least three carbon atoms, R' is selected from the group consisting of hydrogen, halogen and alkyl groups, and wherein the molecule has at least 11 carbon atoms.

2. A composition as defined in claim 1 wherein the salicylic acid or salt thereof has the formula

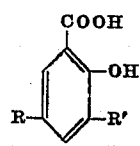

3. A composition as defined in claim 2 wherein the radical R is a tertiary alkyl radical containing from 8 to 12 carbon atoms.

4. A composition as defined in claim 2 wherein the salicylic acid or salt thereof has less than about 40 carbon atoms.

5. A composition as defined in claim 1 wherein the solvent further comprises up to about 90 percent by volume of a water immiscible petroleum fraction.

6. A composition as defined in claim 1 wherein isoamyl alcohol is present in the solvent in a proportion up to about 50 percent by volume.

7. A composition as defined in claim 6 wherein isoamyl alcohol is present in the solvent in a proportion greater than about 25 percent by volume.

8. A composition as defined in claim 7 wherein the salicylic acid or salt thereof has the formula

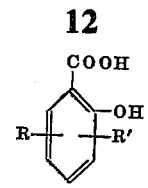

9. A composition as defined in claim 8 wherein the solvent further comprises up to about 75 percent by volume of a water immiscible petroleum fraction.

10. A composition as defined in claim 9 wherein the radical R is a tertiary alkyl radical containing from 8 to 12 carbon atoms.

* * * * *

UNITED STATES PATENT OFFICE
CERTIFICATE OF CORRECTION

Patent No. 3,839,222    Dated October 1, 1974

Inventor(s) Edward A. Grannen

It is certified that error appears in the above-identified patent and that said Letters Patent are hereby corrected as shown below:

In the heading, Item [76] should read - Assignee: Occidental Petroleum Corporation, Los Angeles, California;
Claim 8, column 12, line 3, the formula should be:

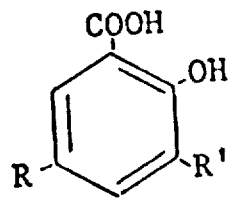

Signed and sealed this 31st day of December 1974.

(SEAL)
Attest:

McCOY M. GIBSON JR.
Attesting Officer

C. MARSHALL DANN
Commissioner of Patents